[11] Patent Number: 5,348,270
[45] Date of Patent: Sep. 20, 1994

[76] Inventor: Khanh Dinh, 1618 SW. 76th Terr., Gainsville, Fla. 32607

[21] Appl. No.: 963,662

[22] Filed: Oct. 20, 1992

[51] Int. Cl.⁵ .......................................... F16K 31/145
[52] U.S. Cl. ................... 251/61.1; 137/553; 92/91
[58] Field of Search ............... 236/49.4; 138/93; 251/12, 61.1, 129.04; 62/293; 92/90, 91; 91/403

[56] References Cited

U.S. PATENT DOCUMENTS

| Re. 29,302 | 7/1977 | De Lepeleire | 251/43 |
|---|---|---|---|
| 2,336,450 | 12/1943 | Voorhess et al. | 92/90 X |
| 3,022,977 | 2/1962 | Jones | 251/61.1 |
| 3,126,028 | 4/1961 | Kurfiss | 137/329.01 |
| 3,465,814 | 3/1968 | Heck et al. | 165/2 |
| 3,494,588 | 2/1970 | Kisling, III | 251/5 |
| 3,588,036 | 6/1971 | Harter | 251/61 |
| 4,006,754 | 2/1977 | Houston | 137/614.21 |
| 4,040,564 | 8/1977 | Waeldner et al. | 251/60 X |
| 4,186,876 | 2/1980 | Clark et al. | 137/468 X |
| 4,506,830 | 3/1985 | Francel | 236/82 X |
| 4,614,152 | 9/1986 | Fukasaku et al. | 137/625.4 X |
| 4,703,913 | 11/1987 | Hunkapiller | 251/61.1 |
| 4,787,408 | 11/1988 | Twerdochlib | 251/61.1 X |
| 5,016,856 | 5/1991 | Tartaglino | 251/61 |
| 5,170,986 | 12/1992 | Zelczer et al. | 251/61.1 |

FOREIGN PATENT DOCUMENTS

| 2263435 | 7/1975 | France | 251/61.1 |
|---|---|---|---|
| 2079898 | 1/1982 | United Kingdom | 251/61.1 |

OTHER PUBLICATIONS

"Lightweight Valve Closes Duct Quickly" NASA Tech Briefs, Dec. 1991.
"Flexdampers Go Where No Other Damper Can!". 1992 Ashre Show Literature Supplement G92–14X.
"Automatic Inflatable Damper System" SPS 150–891.

*Primary Examiner*—William E. Wayner
*Attorney, Agent, or Firm*—Nilles & Nilles

[57] ABSTRACT

A damper includes an elastic bladder which is attached to and surrounds a support element mountable in a ventilation duct. The bladder inflates when supplied with fluid to restrict the available air space within the duct, thus restricting airflow through the duct. The amount of restriction can be regulated by monitoring the degree of inflation of the bladder and by controlling the degree of inflation to provide the desired airflow restriction rate. The bladder may be inflated by supplying pressurized air to the interior of the bladder through the support element or by vaporizing a refrigerant in communication with the bladder. The damper may comprise a single bladder extending longitudinally through the duct or a plurality of bladders extending transversely across the duct.

17 Claims, 6 Drawing Sheets

BLADDER DAMPER

BACKGROUND OF THE INVENTION

1. Field of the Invention

The present invention relates to dampers and, more particularly, relates to adjustable dampers capable of providing a variable restriction of airflow through ventilation ducts.

2. Discussion of the Related Art

Ventilation in modern buildings requires that air be circulated and distributed to meet the requirements of the different parts of the building. Airflow rates are usually controlled via dampers which are adjusted either manually or automatically to vary the airflow rates through ventilation ducts. These dampers may be placed in ducts leading to individual rooms of a building or may be provided in larger ducts which supply air to east and west halves of the building. These latter dampers, when placed in air conditioning systems, are typically controlled so as to supply more cooling air to the east side of the building in the morning and to the west side in the afternoon.

The typical damper comprises a louvered device mounted to the inside of a ventilation duct. This typical device comprises a frame which is dimensioned to match the shape of the ventilation duct and in which is mounted a plurality of louvers or slats which extend transversely across the ventilation duct. These slats are rotatable about the frame from positions permitting substantially free flow of air through the damper to positions blocking all or nearly all of the air flowing through the damper. The louvers or slats are typically adjusted manually via a lever or automatically via an electrical, hydraulic, or pneumatic motor.

Louvered dampers of the type discussed above exhibit several disadvantages. The individual slats or louvers must be connected to a common linkage but at the same time must be individually rotatable with respect to the frame. This results in a relatively complex structure which is difficult and expensive to assemble and which requires frequent maintenance. Jamming often occurs because of the buildup of dust or corrosion between the slats and the frame.

Louvered dampers may also vibrate when air is flowing through the duct, or produce an unpleasant whistling noise as air rushes between adjacent slats. Such dampers are also difficult to install in ventilation ducts because their frames engage the entire circumference of the associated ducts. As a result, all or substantially all of a cross section of a duct must be accessible when the damper is mounted in the duct. Retrofitting dampers in existing ducts is therefore difficult, if not impossible.

In addition, louvered dampers having rigid frames are either not adjustable or can be adjusted only within narrow limits. Accordingly, such dampers must be designed with relatively close tolerances to closely match the shape of the ventilation ducts in which they are to be installed. A square duct thus requires a square damper, a round duct requires a round damper, etc. As a result, retailers must carry a wide variety of dampers to match the demands of a particular application and must custom build dampers to match other applications.

OBJECTS AND SUMMARY OF THE INVENTION

It is therefore an object of the invention to provide a damper which is simple in construction and in operation.

Another object of the invention is to provide a damper which can be easily retrofitted into existing ventilation ducts.

Still another object of the invention to provide a damper which can be used in ventilation ducts of a variety of sizes and shapes.

Yet another object of the invention is to provide a damper which is reliable and quiet in operation.

In accordance with a first aspect of the invention, these and other objects are achieved by providing an apparatus including a ventilation duct and a damper provided in the ventilation duct. The damper comprises a support element at least a portion of which is disposed inside the ventilation duct, and an inflatable bladder which is attached to and surrounds the support element, which permits virtually unobstructed airflow through the ventilation duct when deflated, and which restricts airflow through the ventilation duct when inflated.

Advantageously, the support pipe is generally L-shaped and has first and second legs. The first leg is attached to the sidewall of the ventilation duct, and the bladder is attached to the second leg. The support element may comprise a hollow support pipe having at least one hole formed therein for the passage of fluid therethrough. The bladder covers the hole and is inflatable under the injection of pressurized fluid from the hole.

The apparatus preferably includes a regulating device which regulates the expansion of the bladder. The regulating device preferably includes a position indicator providing a visual or electrical indication of the degree of expansion of the bladder.

The portion of the support element which receives the bladder may extend generally collinear with a longitudinal centerline of the ventilation duct, or may extend transversely across the ventilation duct. In the latter case, a plurality of the support elements and bladders may be provided, the support elements extending in parallel with one another.

Another object of the invention is to provide a process of installing a damper in ventilation duct of a heating or cooling system.

In accordance with this aspect of the invention, the process includes providing a ventilation duct having a wall having an opening formed therein and providing a damper. The damper includes a support element, and a bladder which is attached to and surrounds the support element and which is inflatable under fluid pressure within the bladder. Other steps include inserting the support element through the opening and into the ventilation duct such that a first portion extends within the ventilation duct and a second portion extends through the opening of the wall, and then mounting the second portion of the support element on the wall of the ventilation duct.

These and other objects, features, and advantages of the present invention will become more apparent to those skilled in the art from the following detailed description. It should be understood, however, that the detailed description and specific examples, while indicating preferred embodiments of the present invention, are given by way of illustration and not of limitation.

Many changes and modifications within the scope of the present invention may be made without departing from the spirit thereof, and the invention includes all such modifications.

BRIEF DESCRIPTION OF THE DRAWINGS

The above and further objects of the invention will become more readily apparent as the invention is more clearly understood from the detailed description to follow, reference being made to the accompanying drawings in which like reference numerals represent like parts throughout, and in which.

DETAILED DESCRIPTION OF THE PREFERRED EMBODIMENTS

Resume

Pursuant to the invention, a damper is provided which comprises an elastic bladder which is attached to and surrounds a support element mountable in a ventilation duct. The bladder inflates when supplied with fluid to restrict the available air space within the duct, thus restricting airflow through the duct. The amount of restriction can be regulated by monitoring the degree of inflation of the bladder and by controlling the degree of inflation to provide the desired airflow restriction rate. The bladder may be inflated by supplying pressurized air to the interior of the bladder through the support element or by vaporizing a refrigerant in communication with the bladder. The damper may comprise a single bladder extending longitudinally through the duct or a plurality of bladders extending transversely across the duct.

First Embodiment

Figure 1:
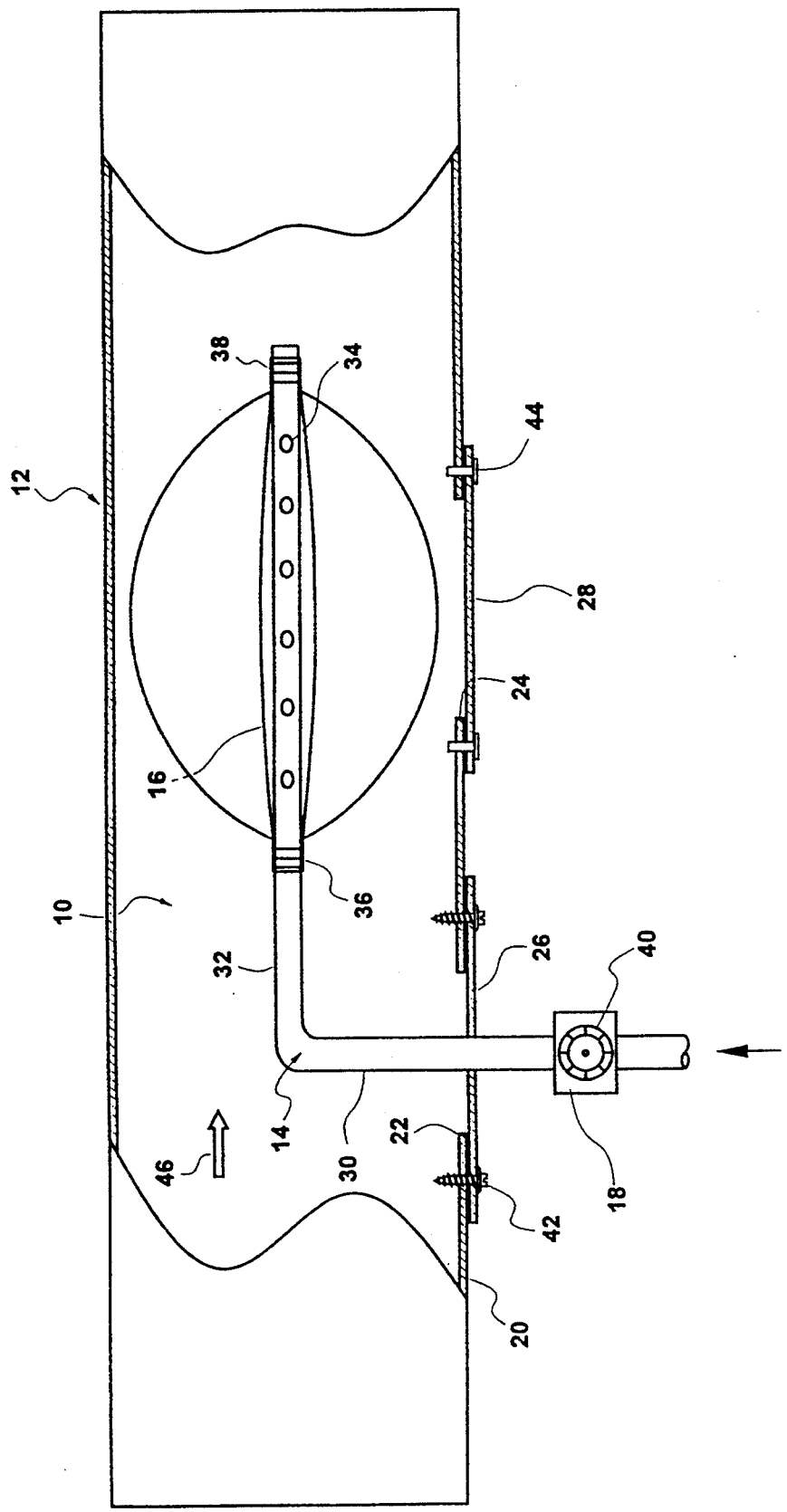
FIG. 1 is an elevation view, illustrated partially in cross section, of a ventilation duct, damper, and control system constructed in accordance with a first embodiment of the invention.

Referring to FIG. 1, a damper 10 constructed in accordance with a first embodiment of the present invention is provided in a ventilation duct 12. Damper 10 includes a support element 14 and an inflatable bladder 16. Airflow into and out of the bladder 16 is regulated via a manually operated pressure regulator or controller 18.

Ventilation duct 12 may be used to supply heating and/or cooling air to a building and may be any of a variety of sizes and/or shapes. Duct 12 may be relatively small and positioned so as to provide ventilation to a single room or may be very large and positioned so as to provide ventilation to an entire building or side of a building. One of the side walls 20 of duct 12 has openings 22 and 24 formed therein which are covered by a support plate 26 and a transparent plate 28 respectively. Plates 26 and 28 are preferably designed to match the contour of side wall 20 of duct 12. Plate 26 is made of a material such as a metal which is sufficiently rigid to support element 14 and bladder 16.

Support element 14 is a generally L-shaped tubular pipe formed from a rigid material, preferably metal, having first and second legs 30 and 32. The first leg 30 is soldered, glued, or otherwise secured to plate 26 and extends through the plate 26 and thus of the side wall 20 of ventilation duct 12 and is coupled to an outlet port of controller 18. The second leg 32 is positioned on or proximate the longitudinal center line of ventilation duct 12 and has holes 34 formed therein for the passage of pressurized air into and out of the interior of bladder 16. Bladder 16 is formed from an elongated rubber, elastomeric, or other inflatable elastic element, covers the holes 34, and has opposed ends which are sealed to the annular side surface of second leg 32 of pipe 14, e.g., by rubber O rings 36 and 38. The free end of leg 32 is plugged or otherwise sealed.

In the illustrated embodiment, controller 18 includes a valve or valves connecting the support pipe 14 to a source of pressurized air (not shown) and operated by a manually operated device such as dial 40. Fluid flow control may be performed, e.g., via a single three-way valve or a pair of two-way valves that are mechanically or electrically operated by rotation of dial 40. Such control devices are, per se, well known in the art and accordingly will not be described in more detail.

Damper 10 can be easily retrofitted into an existing ventilation duct 12 in the following manner. First, relatively small openings 22 and 24 are cut or drilled in the side wall 20 of duct 12. Then, the support element 14 bearing the bladder 12 is inserted through the opening 22 and rotated into the position illustrated in FIG. 1. Support plate 26 and transparent plate 28 are then each secured in position by a pair of screws 42 and 44. The leg 30 of support pipe 14 is then coupled to the appropriate output port of controller 18 in any suitable manner. Thus, the damper 10 can be secured within ventilation duct 12 without providing any framework within the duct and by attaching only a single plate to the exterior of the duct. Access to more than a small portion of the outer periphery of duct 12 is thus unnecessary. Accordingly, retrofitting is facilitated.

The damper 10 illustrated in FIG. 1 operates as follows. When unobstructed airflow through the duct 12 in the direction of arrow 46 is desired, dial 40 is rotated to a position which adjusts controller 18 so as to prevent any air from flowing into support pipe 14. Accordingly, the normally open bladder 16 remains deflated and thus takes on the shape illustrated by solid lines in FIG. 1. Because the bladder 16 is much longer than it is wide, it has an aerodynamic shape which facilitates airflow over the damper. Its location on the centrally positioned longitudinally extending leg 32 of L-shaped pipe 14 also prevents it from rattling or vibrating against the side of the duct. Whistling and rattling noises associated with some louvered dampers are thus avoided.

Assuming that the operator wishes to restrict airflow through duct 12, he or she rotates dial 40 to adjust controller 18 so as to admit an increment of air into support pipe 14 from the source of pressurized air. This air is injected from holes 34 into the interior of bladder 16, thus inflating the bladder as illustrated in broken lines in FIG. 1. The degree of inflation can be observed through transparent plate 24, thus permitting the operator to monitor the amount of airflow restriction and to use this visual feedback to adjust the position of the dial 40 to provide the desired flow restriction through the duct 12.

The bladder 16 is capable of efficiently obstructing airflow through ducts of different shapes because it is very flexible and is positioned in the central portion of the duct on the second leg 32 of support pipe 14 and thus easily conforms to the shape of the interior of the duct. It can thus be used with ducts of square, rectangular, trapezoidal, circular, or virtually any other cross section. In addition, because it has no relatively moveable mechanical parts, noises and the possibilities of jamming, failure, corrosion, etc. are greatly reduced. Nor does it require periodic maintenance or cleaning. If the bladder breaks for any reason, it can be easily replaced simply by removing screws 42, by extracting the support pipe 14 from the duct 12, by replacing the bladder 16 with a new one, and by reassembling the damper.

Second Embodiment

Figure 2:
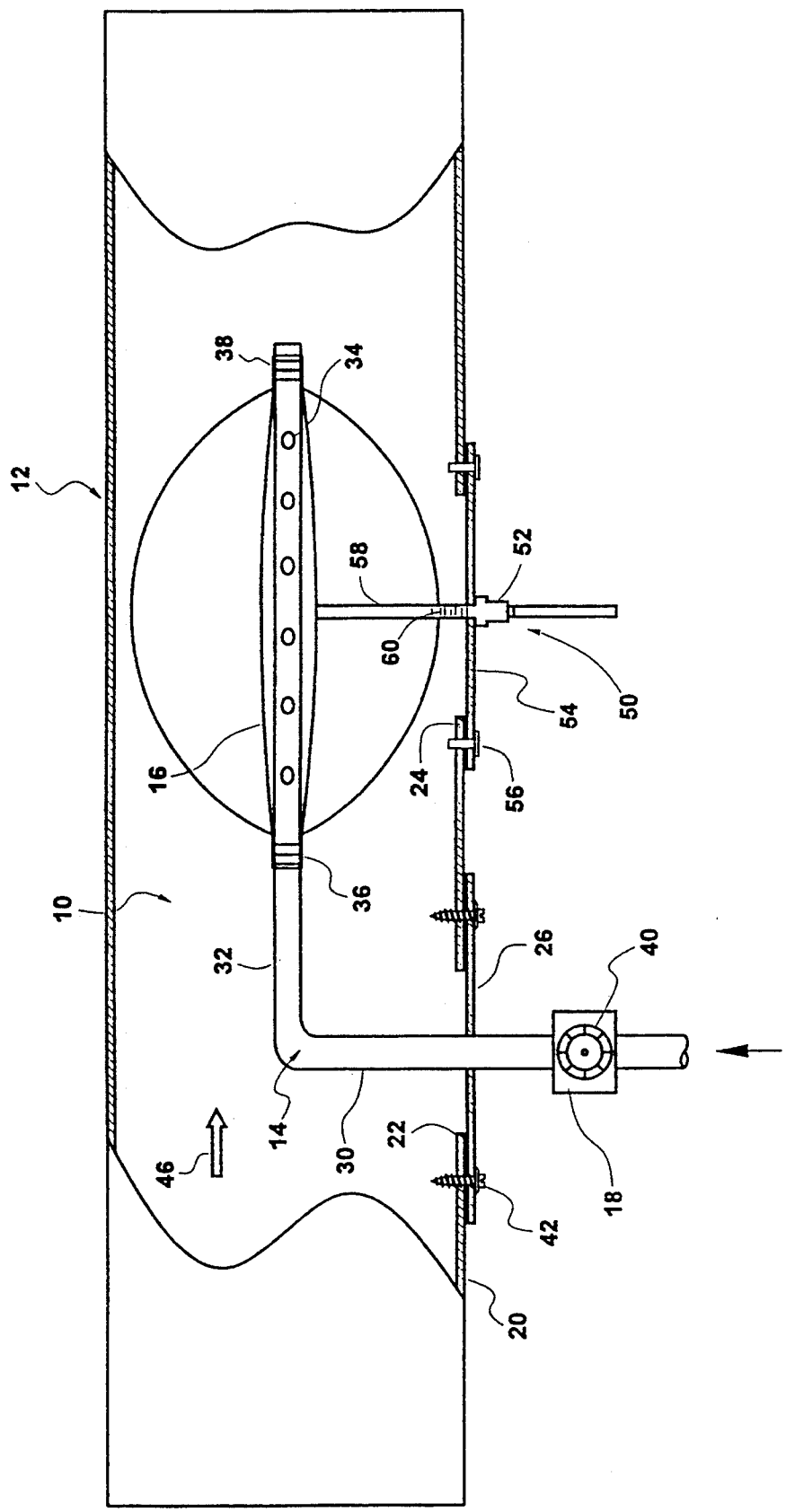
FIG. 2 is an elevation view, illustrated partially in cross section, of a ventilation duct, damper, and damper control system constructed in accordance with a second embodiment of the invention.

Referring to FIG. 2, a bladder damper having a manually operated regulating device is illustrated which differs from that illustrated in FIG. 1 only in that its regulating device utilizes a different type of position indicator. More specifically, instead of providing a transparent plate, the bladder damper of this embodiment employs an indicator 50 comprising a tubular support 52 which is affixed to a support plate 54 which is in turn secured to the side wall 20 of ventilation duct 12 via screws 56. An indicator rod 58 is slidably received within tubular support 52 and has indicia 60 formed thereon. The indicator rod 58 is biased towards the bladder 16 by a spring (not shown) provided inside tubular support 52. This rod contacts the side of the bladder 16 and moves downwardly as illustrated in FIG. 2 upon inflation of bladder 16. The degree of inflation can be ascertained from monitoring indicia 60.

Indicator 50 offers the advantage of providing a visual indication of the degree of inflation of bladder 16 without having to directly view the bladder. This in turn eliminates the need for illuminating the interior of the duct 12 or for otherwise permitting the entry of sufficient into duct 12 to enable viewing of the bladder 16. This arrangement also permits the placement of the sidewall 20 of duct 12 at a location which is relatively remote from any location which is readily observable by the operator. To this end, the length of the rod 58 could be varied so as to be flush with a viewable surface or hidden from view when the bladder is fully deflated and to extend into a viewing area when the bladder 16 is inflated. Design flexibility is thus considerably increased.

Third Embodiment

Figure 3:
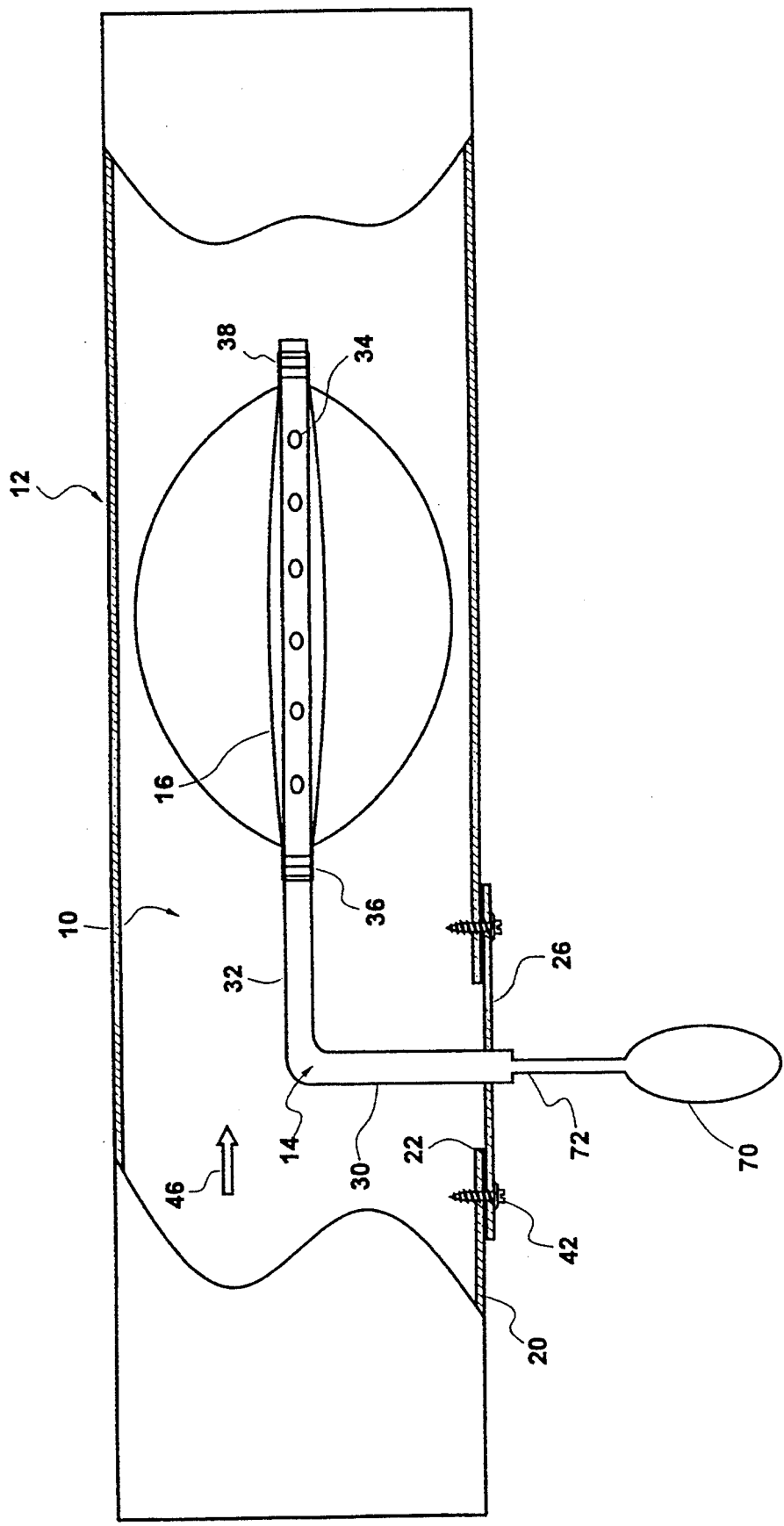
FIG. 3 is an elevation view, illustrated partially in cross section, of a ventilation duct, damper, and damper control system constructed in accordance with a third embodiment of the invention.

Inflation and deflation of a bladder of a bladder damper constructed in accordance with the present invention could also be regulated without any operator input. For instance, referring to FIG. 3, the inflation of bladder 16 could be regulated by employing a freon bulb 70 as the source of pressurized fluid for inflating the bladder 16. Freon bulb 70 is connected to support pipe 14 via a suitable capillary tube 72. Freon or another suitable refrigerant is provided in bulb 70 and vaporizes when the temperature of the air surrounding bulb 70 reaches a designated temperature, thus directly or indirectly inflating bladder 16 and decreasing the flow rate of heating air through duct 12 in the direction of arrow 46. Bladder 16 will deflate again when the temperature of the air surrounding bladder 70 decreases below the designated temperature. The construction and operation of freon bulbs are, per se, well known and thus will not be described in greater detail.

In some instances, it may be desirable to regulate the flow rate of air through duct 12 based upon the temperature of the air flowing through the duct instead of the outside air temperature. In this case, a particularly simple arrangement could be provided in which the freon bulb 70 and the holes 34 in the leg 32 of support pipe 14 are eliminated and in which freon or another refrigerant is placed directly into the sealed bladder 16. This refrigerant will vaporize upon the attainment of a designated temperature within duct 12 and inflate the bladder 16. Conversely, the refrigerant will condense and deflate the bladder when the temperature again drops below the designated temperature.

Fourth Embodiment

Figure 4:
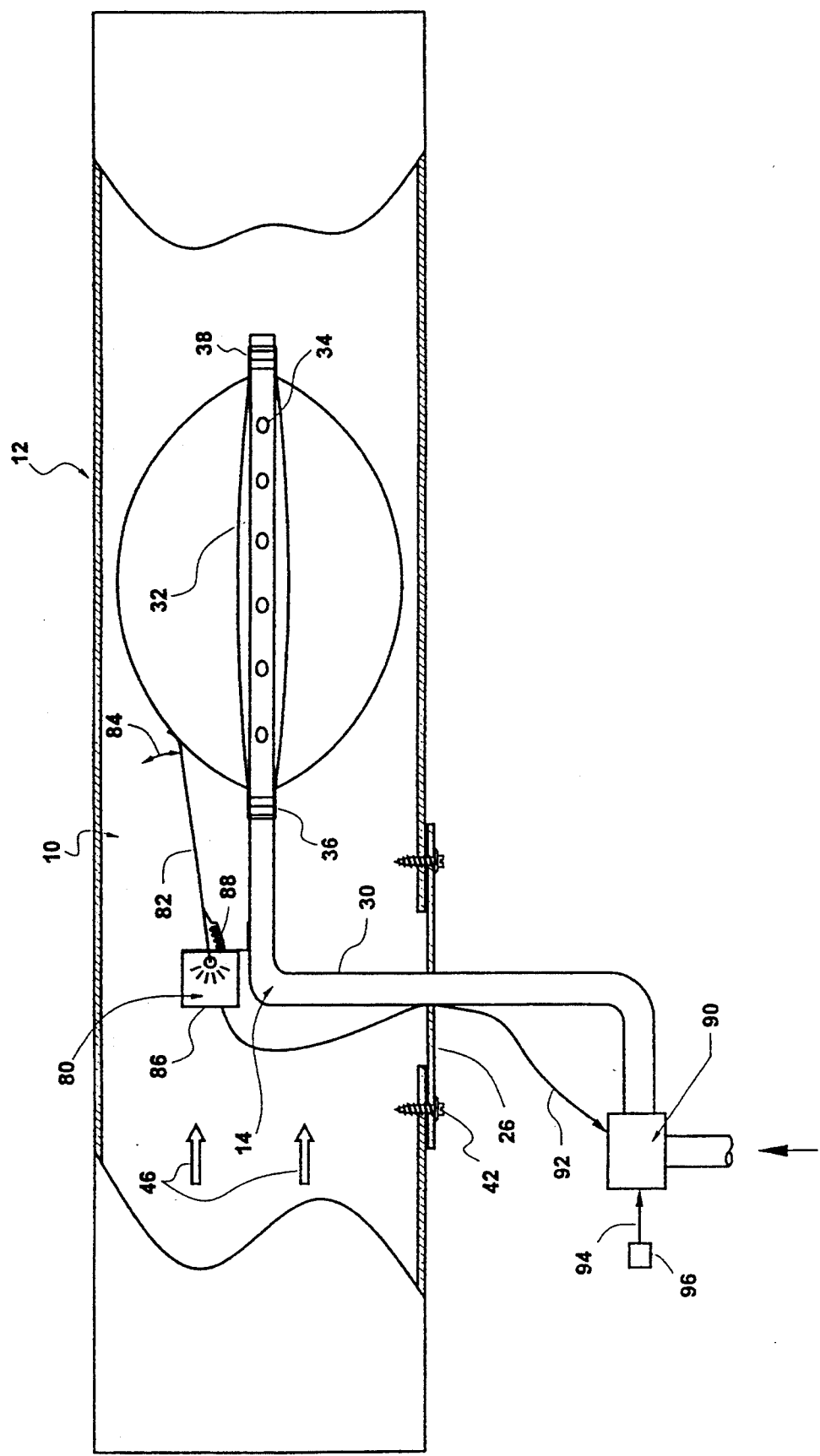
FIG. 4 is an elevation view, illustrated partially in cross section, of a ventilation duct, damper, and damper control system constructed in accordance with a fourth embodiment of the invention.

Referring to FIG. 4, another control system 80 which does not require manual manipulation to inflate and deflate the bladder comprises a position indicator comprising a sensing lever 82 which contacts the side of bladder 16 so as to rotate in the direction of arrow 84 upon inflation or deflation of the bladder 16. Sensing lever 82 is pivotally connected to a position sensor 86 and is biased into contact with the bladder 16 by a spring 88. Sensor 86 contains a variable resistor, a rheostat, or any other device generating an electrical signal which varies with the position of lever 82. The electrical signal generated by sensing device 86 is transmitted to an automatic pressure regulator or controller 90 via a suitable control line 92. Controller 90 includes an electrically operated valve or valves which selectively connect the support pipe 14 to a source of pressurized air (not shown) and to the atmosphere. The desired airflow rate through duct 12 is supplied to controller 90 via a signal 94 from an input device 96 which may include a thermostat or any of a variety of known manually or automatically actuated command devices. The signals from devices 86 and 96 are combined so as to produce control signals for controller 90 via any of a variety of known feedback processes.

Fifth Embodiment

Figure 5:
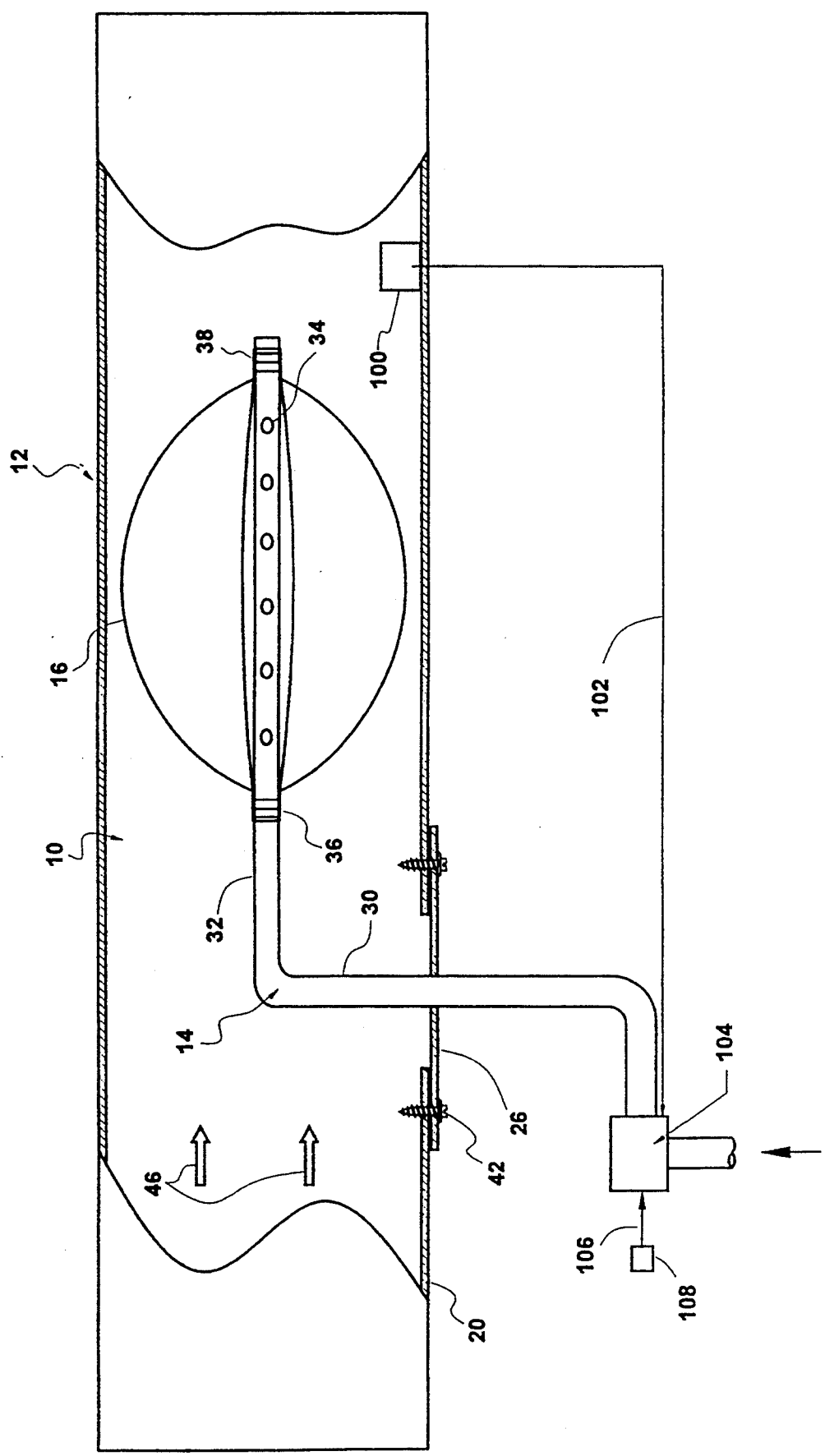
FIG. 5 is an elevation view, illustrated partially in cross section, of a ventilation duct, damper, and damper control system constructed in accordance with a fifth embodiment of the invention.

Referring to FIG. 5, a position indicator for bladder 16 could be eliminated altogether and the airflow through duct 12 monitored via a suitable flow rate detector 100. Detector 100 may comprise a venturi meter or any of a variety of known devices which are capable of detecting the airflow rate through an enclosed space. This detector supplies an electrical signal 102 to a controller 104, where it is combined with a signal 106 from a suitable command device 108 to control inflation and deflation of bladder 16.

Sixth Embodiment

The bladder damper of the present invention need not extend longitudinally of the ventilation duct as illustrated in FIGS. 1 through 5, but instead could extend transversely across the duct. Such positioning facilitates the provision of a plurality of such bladder dampers in parallel with one another. While such an arrangement may be more difficult to retrofit into an existing ventilation duct, it offers the advantage of assuring complete or substantially complete blockage of airflow through the duct.

Figure 6:
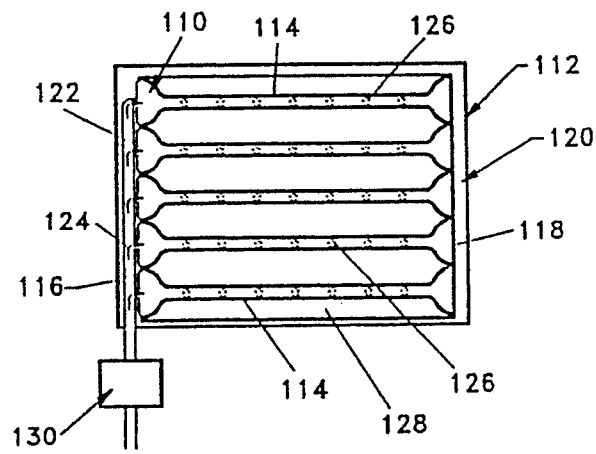
FIG. 6 is an end view, illustrated partially in cross section, of a ventilation duct, damper, and damper control system constructed in accordance with a sixth embodiment of the invention.
Figure 7:
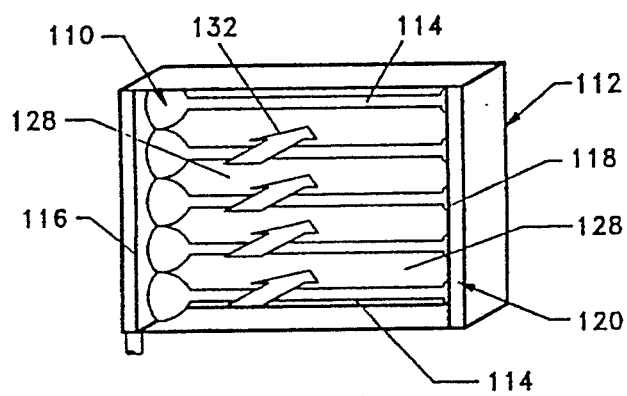
FIG. 7 is a perspective view of the damper and ventilation duct of FIG. 6 with the damper being illustrated in a first operational state.
Figure 8:
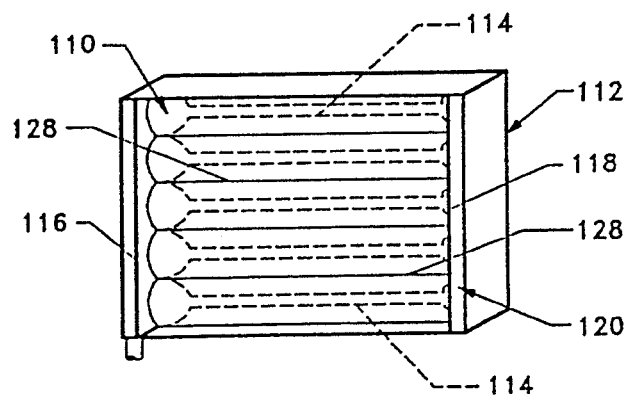
FIG. 8 is a perspective view of the damper and ventilation duct of FIG. 6 with the damper being illustrated in a second operational state.

Referring to FIGS. 6 through 8, a bladder damper 110 constructed in accordance with this embodiment of the invention is provided in a ventilation duct 112. Damper 110 includes a plurality of parallel support pipes 114 each having opposed ends connected to facing walls 116, 118 of a frame 120 of damper 110. A manifold 122 is provided within frame 120 and has a plurality of holes 124 for the passage of pressurized air into and out of the hollow interiors of support pipes 114. This pressurized air is forced through holes 126 formed in support pipes 114 and into the interior of bladders 128. Airflow through the manifold 122 is regulated by the operation of a suitable mechanically or automatically actuated control device 130 selectively connecting the manifold 122 to the atmosphere and to a source of pressurized air (not shown).

The operation of the bladder damper of FIGS. 6 through 8 will now be described. When unhindered flow of air through ventilation duct 112 is desired, the manifold 122 is connected to the atmosphere by controller 130 so that the bladders 128 are completely deflated. Accordingly, air may flow substantially unobstructed past support pipes 114 and through ventilation duct 112 in the direction of arrows 132 in FIG. 7. The airflow rate can be restricted by supplying pressurized air to manifold 122 to inflate the bladders 128. Because several such bladders extend in parallel with one another across the full width of the duct 112, they can be expanded into contact with one another and into contact with the side walls of the ventilation duct as illustrated in FIG. 8 so as to substantially completely block the flow of air through the duct 112. The flexible dampers provide better sealing than metallic louvers and do not rattle.

Many variations and modifications could be made to the present invention in addition to those discussed above without departing from the spirit or scope of the present invention. For instance, inflation and deflation of the damper could be regulated by any of a variety of manual and/or automatic feedback control systems instead of or in addition to those discussed above. The bladders need not be dimensioned or positioned as illustrated but could be provided in a ventilation duct in any desired position or orientation.

I claim:

1. An apparatus comprising:
   (A) a ventilation duct having a sidewall; and
   (B) a normally open damper provided in said ventilation duct, said damper comprising
       (1) a support element which is generally L-shaped and which has first and second legs, said first leg being attached to said sidewall of said ventilation duct and said second leg being positioned in said ventilation duct; and
       (2) an inflatable bladder which is attached to and surrounds said second leg of said support element, which permits virtually unobstructed airflow through said ventilation duct when deflated, and which restricts airflow through said ventilation duct when inflated, said bladder presenting an aerodynamic profile in both a deflated, open state and a partially inflated, partially closed state, said aerodynamic profile facilitating airflow past said bladder.

2. An apparatus according to claim 1, wherein said support element comprises a hollow support pipe having at least one hole formed therein for the passage of fluid therethrough, and wherein said bladder covers said hole and is inflatable under the injection of pressurized fluid from said hole, said apparatus further comprising a source of pressurized fluid connected to said second portion of said support pipe.

3. An apparatus according to claim 1, wherein a portion of said support element which receives said bladder extends generally collinear with a longitudinal centerline of said ventilation duct.

4. An apparatus, comprising:
   (A) a ventilation duct; and
   (B) a damper provided in said ventilation duct, said damper comprising
       (1) a support element at least a portion of which is disposed inside said ventilation duct;
       (2) an inflatable bladder which is attached to and surrounds said support element, which permits virtually unobstructed airflow through said ventilation duct when deflated, and which restricts airflow through said ventilation duct when inflated; and
       (3) a regulating device which regulates the expansion of said bladder, wherein said regulating device includes a position indicator providing an indication of the degree of expansion of said bladder.

5. An apparatus according to claim 4, wherein said regulating device further comprises an automatic pressure regulator and wherein said position indicator is connected to an electronic control device which generates an electrical position indication signal which is transmitted to said pressure regulator.

6. An apparatus according to claim 4, wherein said regulating device further comprises a manually-controlled pressure regulator and wherein said position indicator provides a visual indication of the degree of inflation of said bladder.

7. An apparatus according to claim 6, wherein said position indicator comprises one of (1) a transparent cover located on said sidewall of said ventilation duct and (2) a spring-loaded rod extending through said sidewall of said ventilation duct.

8. An apparatus, comprising:
   (A) a ventilation duct; and
   (B) a normally open damper provided in said ventilation duct, said damper comprising
       (1) a support element at least a portion of which is disposed inside said ventilation duct;
       (2) an inflatable bladder which is attached to and surrounds said support element, which permits virtually unobstructed airflow through said ventilation duct when deflated, and which restricts airflow through said ventilation duct when inflated; and (3) a regulating device which regulates the expansion of said bladder.

9. An apparatus according to claim 8, wherein said regulating device comprises a refrigerant which vaporizes at a designated temperature.

10. A process comprising:
(A) providing a ventilation duct having a wall having an opening formed therein;
(B) providing a normally open damper including
(1) a support element, and
(2) a bladder which is attached to and surrounds said support element and which is inflatable under fluid pressure within said bladder, said bladder presenting an aerodynamic profile in both a deflated, open state and a partially inflated, partially closed state, said aerodynamic profile facilitating airflow past said bladder;
(C) inserting said support element through said opening and into said ventilation duct such that a first portion extends within said ventilation duct and a second portion extends through said opening of said wall; then
(D) mounting said second portion of said support element on said wall of said ventilation duct; and then
(E) selectively pressurizing said bladder to over-atmospheric pressure to inflate said bladder, thereby at least partially closing said damper.

11. A process according to claim 10, wherein
said step (B) further comprises providing a support plate which is connected to said second portion of said support element, and
said step (D) comprises securing said support plate to said wall of said ventilation duct.

12. An apparatus, comprising:
(A) a ventilation duct having a sidewall; and
(B) a normally open damper provided in said ventilation duct, said damper comprising
(1) a support element which is generally L-shaped and has first and second legs, said first leg being attached to said sidewall of said ventilation duct and said second leg being positioned within said ventilation duct;
(2) an inflatable bladder which is attached to and surrounds said second leg of said support element, which permits virtually unobstructed airflow through said ventilation duct when deflated, and which restricts airflow through said ventilation duct when inflated; and
(3) a support plate which is mounted on said sidewall of said ventilation duct and on which is mounted said first leg of said support element.

13. An apparatus, comprising:
(A) a ventilation duct; and
(B) a normally open damper provided in said ventilation duct, said damper comprising
(1) a support element at least a portion of which is disposed inside said ventilation duct;
(2) an inflatable bladder which is attached to and surrounds said support element, which permit virtually unobstructed airflow through said ventilation duct when deflated, and which restricts airflow through said ventilation duct when inflated, wherein said bladder communicates with a refrigerant which vaporizes to inflate said bladder when a sensed temperature reaches a designated level.

14. A process comprising:
(A) providing a ventilation duct having a wall having an opening formed therein;
(B) providing a normally open damper including
(1) a support element, and
(2) a bladder which is attached to and surrounds said support element and which is inflatable under fluid pressure within said bladder;
(C) inserting said support element through said opening and into said ventilation duct such that a first portion extends within said ventilation duct and a second portion extends through said opening of said wall; then
(D) mounting said second portion of said support element on said wall of said ventilation duct; then
(E) selectively pressurizing said bladder to over-atmospheric pressure to inflate said bladder, thereby at least partially closing said damper; and then
(F) indicating the degree of expansion of said bladder and operating a regulating device to regulate the expansion of said bladder based on said indication.

15. An apparatus, comprising:
(A) a ventilation duct; and
(B) a normally open damper provided in said ventilation duct, said damper comprising
(1) a plurality of support elements at least a portion of each of which is disposed inside said ventilation duct in parallel with corresponding portions of the remaining support elements; and
(2) a plurality of inflatable bladders each of which (i) is attached to and surrounds a corresponding one of said support elements, (ii) permits virtually unobstructed airflow through said ventilation duct when deflated, and (iii) restricts airflow through said ventilation duct when inflated.

16. A process comprising:
(A) providing a ventilation duct having a wall having an opening formed therein;
(B) providing a normally open damper including
(1) a support element having first and second portions,
(2) a support plate which is connected to said second portion of said support element,
(2) a bladder which is attached to and surrounds said first portion of said support element and which is inflatable under fluid pressure within said bladder;
(C) inserting said support element through said opening and into said ventilation duct such that said first portion extends within said ventilation duct and said second portion extends through said opening of said wall; then
(D) mounting said second portion of said support element on said wall of said ventilation duct by securing said support plate to said wall of said ventilation duct; and then
(E) selectively pressurizing said bladder to over-atmospheric pressure to inflate said bladder, thereby at least partially closing said damper.

17. An apparatus comprising:
(A) a ventilation duct; and
(B) a normally open damper provided in said ventilation duct, said damper comprising
(1) a plurality of support elements, at least a portion of each of said support elements being disposed inside said ventilation duct and extending transversely across said ventilation duct in parallel with corresponding portions of the remaining support elements; and
(2) a plurality of inflatable bladders each of which is attached to and surrounds said portion of a respective one of said support elements, said bladders permitting virtually unobstructed airflow through said ventilation duct when deflated and restricting airflow through said ventilation duct when inflated, each of said bladders presenting an aerodynamic profile in both a deflated, open state and a partially inflated, partially closed state, said aerodynamic profile facilitating airflow past said bladders.

* * * * *